(12) United States Patent
Menon et al.

(10) Patent No.: US 7,039,025 B1
(45) Date of Patent: May 2, 2006

(54) SYSTEM AND METHOD FOR PROVIDING GENERAL PACKET RADIO SERVICES IN A PRIVATE WIRELESS NETWORK

(75) Inventors: Narayan Menon, Colorado Springs, CO (US); Alan Carlton, Colorado Springs, CO (US); Heinz Wilk, Colorado Springs, CO (US); Steve Howser, Colorado Springs, CO (US)

(73) Assignee: Siemens Communications, Inc., Boca Raton, FL (US)

( * ) Notice: Subject to any disclaimer, the term of this patent is extended or adjusted under 35 U.S.C. 154(b) by 933 days.

(21) Appl. No.: 09/675,312

(22) Filed: Sep. 29, 2000

(51) Int. Cl.
*H04Q 7/00* (2006.01)

(52) U.S. Cl. .......................... 370/328; 370/329; 370/352

(58) Field of Classification Search ................. 370/328, 370/349, 353–356, 338, 329, 352; 455/452.1, 455/456, 456.4, 435.1
See application file for complete search history.

(56) References Cited

U.S. PATENT DOCUMENTS

| | | | |
|---|---|---|---|
| 4,680,786 A | 7/1987 | Baker et al. ................... 379/60 |
| 4,737,978 A | 4/1988 | Burke et al. ................... 379/60 |
| 4,775,999 A | 10/1988 | Williams ....................... 379/59 |
| 4,980,907 A | 12/1990 | Raith et al. .................... 379/63 |
| 5,079,765 A | 1/1992 | Nakamura ............... 370/85.13 |
| 5,235,632 A | 8/1993 | Raith ........................... 379/59 |
| 5,259,017 A | 11/1993 | Langmantel ................. 379/58 |
| 5,353,331 A | 10/1994 | Emery et al. ................. 379/58 |
| 5,440,613 A | 8/1995 | Fuentes ........................ 379/60 |
| 5,448,619 A | 9/1995 | Evans et al. .................. 379/58 |
| 5,463,623 A | 10/1995 | Grimes et al. ................ 370/79 |
| 5,475,681 A | 12/1995 | White et al. .................. 370/60 |
| 5,475,689 A | 12/1995 | Kay et al. ................... 370/95.3 |

(Continued)

FOREIGN PATENT DOCUMENTS

| WO | WO 99/48310 | 9/1999 |
|---|---|---|
| WO | WO 00/48365 | 8/2000 |

OTHER PUBLICATIONS

"Method and System for Providing User Mobility Between Public and Private Wireless Networks", U.S. Appl. No. 09/500,379, Inventors: Steve Howser, et al. Feb. 28, 2000.
ETSI GSM 03.60 Standard, GPRS Service Description, Stage 2, EN 301 344 V7.4.0, 1998.

* cited by examiner

*Primary Examiner*—Chi Pham
*Assistant Examiner*—Prenell Jones

(57) ABSTRACT

A system for providing general packet radio services (GPRS) to a mobile station includes a packet network operable to transport packets of information, a database coupled to the packet network and operable to store profile information associated with the mobile station, and a base station operable to communicate with the mobile station over a wireless interface. The system also includes an access point coupled to the base station and to the packet network. The access point is operable to communicate with the mobile station through the base station. The system further includes a GPRS support node coupled to the packet network and operable to communicate with the access point. The GPRS support node is also operable to monitor a location of the mobile station and to route packets of information for the mobile station to the access point. In addition, the system includes an interworking point coupled to the packet network. The interworking point is operable to communicate with the GPRS support node using a first protocol and with a public network using a second protocol. The interworking point is also operable to interwork between the first protocol and the second protocol.

34 Claims, 7 Drawing Sheets

U.S. PATENT DOCUMENTS

| | | | |
|---|---|---|---|
| 5,506,887 A | 4/1996 | Emery et al. | 379/58 |
| 5,537,610 A | 7/1996 | Mauger et al. | 379/58 |
| 5,579,384 A | 11/1996 | Seymour | 379/243 |
| 5,602,843 A | 2/1997 | Gray | 370/338 |
| 5,604,737 A | 2/1997 | Iwami et al. | 370/352 |
| 5,610,974 A | 3/1997 | Lantto | 379/59 |
| 5,613,100 A | 3/1997 | Anezaki | 395/500 |
| 5,629,974 A | 5/1997 | Rajala et al. | 379/58 |
| 5,636,218 A | 6/1997 | Ishikawa et al. | 370/410 |
| 5,652,787 A | 7/1997 | O'Kelly | 379/112 |
| 5,655,001 A | 8/1997 | Cline et al. | 370/328 |
| 5,664,005 A | 9/1997 | Emery et al. | 455/422 |
| 5,713,073 A | 1/1998 | Warsta | 455/56.1 |
| 5,715,394 A | 2/1998 | Jabs | 395/200.11 |
| 5,726,979 A | 3/1998 | Henderson et al. | 370/254 |
| 5,734,699 A | 3/1998 | Lu et al. | 379/58 |
| 5,740,374 A | 4/1998 | Raffali-Schreinemachers | 395/200.68 |
| 5,742,596 A | 4/1998 | Baratz et al. | 370/356 |
| 5,742,905 A | 4/1998 | Pepe et al. | 455/461 |
| 5,754,539 A | 5/1998 | Metz et al. | 370/349 |
| 5,764,955 A | 6/1998 | Doolan | 395/500 |
| 5,771,275 A | 6/1998 | Brunner et al. | 379/67 |
| 5,771,465 A | 6/1998 | Böjeryd et al. | 455/554 |
| 5,781,547 A | 7/1998 | Wilson | 370/395 |
| 5,793,762 A | 8/1998 | Penners et al. | 370/389 |
| 5,794,009 A | 8/1998 | Coleman et al. | 395/500 |
| 5,799,153 A | 8/1998 | Blau et al. | 395/200.53 |
| 5,799,250 A | 8/1998 | Veloso et al. | 455/422 |
| 5,809,028 A | 9/1998 | Nethercott et al. | 370/467 |
| 5,818,824 A | 10/1998 | Lu et al. | 370/328 |
| 5,822,569 A | 10/1998 | McPartlan et al. | 395/500 |
| 5,839,067 A | 11/1998 | Jonsson | 455/422 |
| 5,862,134 A | 1/1999 | Deng | 370/352 |
| 5,862,481 A | 1/1999 | Kulkarni et al. | 455/432 |
| 5,870,677 A | 2/1999 | Takahashi et al. | 455/463 |
| 5,873,031 A | 2/1999 | Griffith et al. | 455/412 |
| 5,873,033 A | 2/1999 | Hjern et al. | 455/417 |
| 5,878,347 A | 3/1999 | Joensuu et al. | 455/433 |
| 5,887,256 A | 3/1999 | Lu et al. | 455/426 |
| 5,890,064 A | 3/1999 | Widergen et al. | 455/445 |
| 5,892,802 A | 4/1999 | Jung et al. | 375/354 |
| 5,892,950 A | 4/1999 | Rigori et al. | 395/705 |
| 5,898,931 A | 4/1999 | I'Anson et al. | 455/560 |
| 5,901,352 A | 5/1999 | St-Pierre et al. | 455/426 |
| 5,901,359 A | 5/1999 | Malmstrom | 455/461 |
| 5,913,166 A | 6/1999 | Buttitta et al. | 455/436 |
| 5,924,030 A | 7/1999 | Rautiola et al. | 455/426 |
| 5,943,619 A | 8/1999 | Coyne et al. | 455/433 |
| 5,949,755 A | 9/1999 | Rautiola et al. | 370/338 |
| 5,953,322 A | 9/1999 | Kimball | 370/328 |
| 5,953,651 A | 9/1999 | Lu et al. | 455/408 |
| 5,956,331 A | 9/1999 | Rautiola et al. | 370/338 |
| 5,960,004 A | 9/1999 | Ramström et al. | 370/469 |
| 5,960,176 A | 9/1999 | Kuroki et al. | 395/200.53 |
| 5,960,344 A | 9/1999 | Mahany | 455/432 |
| 5,970,059 A * | 10/1999 | Ahopelto et al. | 370/338 |
| 5,978,672 A | 11/1999 | Hartmaier et al. | 455/413 |
| 5,978,673 A | 11/1999 | Alperovich et al. | 455/417 |
| 5,995,839 A | 11/1999 | Coursey et al. | 455/445 |
| 5,995,843 A | 11/1999 | Sjödin et al. | 455/462 |
| 5,999,810 A | 12/1999 | Fuentes | 455/422 |
| 5,999,813 A | 12/1999 | Lu et al. | 455/435 |
| 6,002,931 A | 12/1999 | Yamaguchi et al. | 455/433 |
| H1836 H | 2/2000 | Fletcher et al. | 455/433 |
| H1837 H | 2/2000 | Fletcher et al. | 455/433 |
| 6,026,086 A | 2/2000 | Lancelot et al. | 370/353 |
| 6,219,557 B1 * | 4/2001 | Havinis | 455/456.4 |
| 6,466,556 B1 * | 10/2002 | Boudreaux | 370/331 |
| 6,571,095 B1 * | 5/2003 | Koodli | 455/435.1 |
| 6,600,732 B1 * | 7/2003 | Sevanto et al. | 370/349 |
| 6,608,832 B1 * | 8/2003 | Forslow | 370/353 |
| 6,618,592 B1 * | 9/2003 | Vilander et al. | 455/452.1 |
| 6,636,502 B1 * | 10/2003 | Lager et al. | 370/352 |
| 6,662,005 B1 * | 12/2003 | Palvianen | 455/414.1 |
| 6,671,511 B1 * | 12/2003 | Forssell et al. | 455/452.1 |
| 6,697,352 B1 * | 2/2004 | Ludwig et al. | 370/349 |
| 6,711,143 B1 * | 3/2004 | Balazinski et al. | 370/329 |

SYSTEM AND METHOD FOR PROVIDING GENERAL PACKET RADIO SERVICES IN A PRIVATE WIRELESS NETWORK

TECHNICAL FIELD OF THE INVENTION

This invention relates generally to the field of communications systems, and more specifically to a system and method for providing General Packet Radio Services (GPRS) in a private wireless network.

BACKGROUND OF THE INVENTION

General Packet Radio Services (GPRS) networks are routinely used to provide packet data services to mobile stations, or wireless units. The mobile station communicates over a wireless interface with a base station, and the mobile station sends and receives data over the wireless interface in the form of data packets. The GPRS network also usually includes support nodes, which facilitate communication between the mobile stations and other elements in the GPRS network. The support nodes also facilitate communication with external networks such as the Internet.

Conventional GPRS systems typically use a Frame Relay network as the backbone network in the system. The Frame Relay backbone network transports information between the different elements in the GPRS system. A corporation, organization, or other enterprise may wish to create a private network for internal use by its own personnel, and the private network communicates with the public GPRS system. One approach to providing a private GPRS network involves adding discrimination capabilities to an element in the public GPRS system, such as in the Home Location Register (HLR). The HLR determines whether a mobile station is in the public GPRS system or a private GPRS network, and the HLR processes data packets transported to and from the mobile station depending on the location of the mobile station.

One problem with this approach is the lack of Frame Relay networks in many enterprises. The public GPRS system typically uses a Frame Relay network as a backbone network. Enterprises often use an internal packet network, such as an Internet Protocol network, to provide computing and data services to its personnel, but enterprises may not use internal Frame Relay networks. The lack of an internal Frame Relay network in an enterprise makes it difficult for the enterprise to establish a private GPRS network.

Another problem with this approach is that it is difficult to add functionality to existing HLRs. Adding functionality to existing HLRs typically requires the addition of hardware, software, and/or firmware to the design of the HLRs. This increases the complexity of the HLR, which also increases the cost of the HLR. Also, modifying the HLR to provide custom features to mobile stations in all private GPRS networks may prevent other customized functions from being deployed and used in specific private GPRS networks.

In addition, adding discrimination functionality to the HLR typically involves the implementation of proprietary functions in the HLRs. Each HLR manufacturer typically implements the discrimination function using proprietary methods and technology. As a result, it is difficult to add HLRs to a public GPRS system. The HLRs of one manufacturer may not work properly with HLRs from other manufacturers because of the proprietary nature of the discrimination functions.

SUMMARY OF THE INVENTION

The present invention recognizes a need for an improved system and method for providing General Packet Radio Services (GPRS) in a private wireless network. The present invention substantially reduces or eliminates problems and disadvantages associated with prior systems and methods.

In one embodiment of the invention, a private wireless network for providing general packet radio services (GPRS) to a mobile station includes a packet network operable to transport packets of information, a database coupled to the packet network and operable to store profile information associated with the mobile station, and a base station operable to communicate with the mobile station over a wireless interface. The private wireless network also includes an access point coupled to the base station and to the packet network. The access point is operable to communicate with the mobile station through the base station. The private wireless network further includes a GPRS support node coupled to the packet network and operable to communicate with the access point. The GPRS support node is also operable to monitor a location of the mobile station and to route packets of information for the mobile station to the access point. In addition, the private wireless network includes an interworking point coupled to the packet network. The interworking point is operable to communicate with the GPRS support node using a first protocol and with a public network using a second protocol. The interworking point is also operable to interwork between the first protocol and the second protocol.

In another embodiment of the invention, a method for providing general packet radio services (GPRS) to a mobile station in a private network includes receiving a registration request from the mobile station. The method also includes receiving from a database first profile information associated with the mobile station, the first profile information also associated with the private network, and receiving from a public network second profile information associated with the mobile station. In addition, the method includes comparing the first and second profile information, and providing GPRS service to the mobile station based on the comparison.

Numerous technical advantages can be gained through various embodiments of the invention. Various embodiments of the invention may exhibit none, some, or all of the following advantages. For example, in one embodiment of the invention, a private network that provides GPRS services may use a packet network as a backbone network. In a particular embodiment, the private network uses an Internet Protocol (IP) network as a backbone network. Because enterprises often use an internal packet network to provide computing and data services to their employees, the enterprises may not need to install a Frame Relay network to act as the backbone of the private network. This may help reduce the overall cost of the private network.

Some embodiments of the invention also provide distributed feature and service control in the public and private networks. The private network may implement a particular set of features and services and provide those features and services to the mobile stations. The mobile stations may receive that set of features and services while in the private network, and the mobile stations may receive a different set of features and services while in the public system. This allows each private network to flexibly and dynamically provide features and services to the mobile stations.

In addition, some embodiments of the present invention allow private networks to operate within a public GPRS system without requiring proprietary functions to be implemented in the public Home Location Register (HLR). This simplifies the development of the HLR because the additional functionality may not need to be implemented in the HLR. This also helps to reduce the difficulty in upgrading HLRs in the public GPRS network because the public network operators may not need to determine whether the HLRs support the use of the same proprietary discrimination functions.

Other technical advantages are readily apparent to one of skill in the art from the attached figures, description, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 8 of the drawings, like numerals being used for like and corresponding parts of the various drawings.

Figure 1:
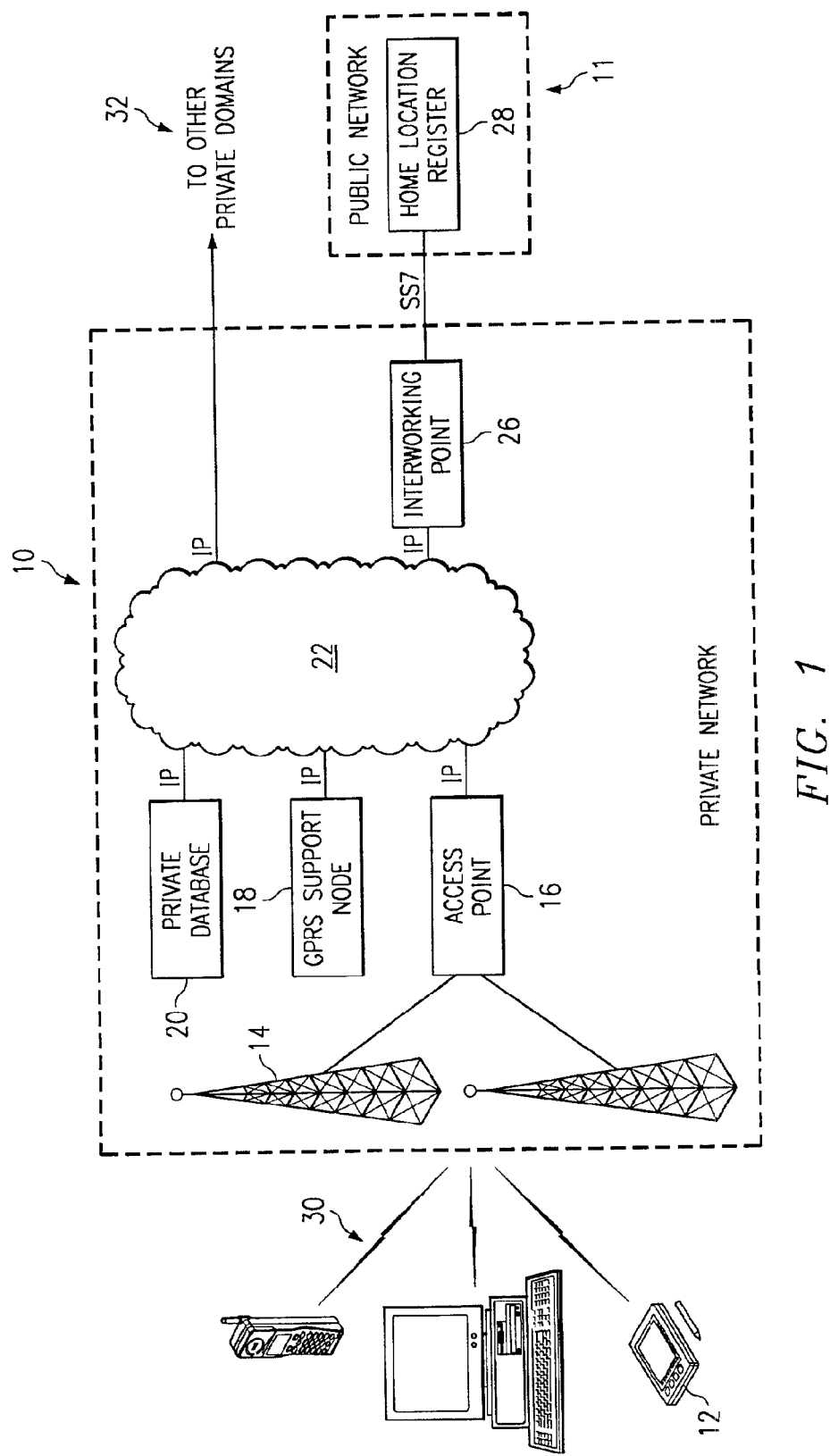
FIG. 1 is a block diagram illustrating one embodiment of a private communication network.

FIG. 1 is a block diagram illustrating one embodiment of a private communications network 10. Private network 10 may provide General Packet Radio Services (GPRS) to one or more mobile stations 12. Private network 10 may also communicate with a public network 11. In the illustrated embodiment, private network 10 includes one or more base stations 14, an access point 16, a GPRS support node (GSN) 18, a private database 20, a packet network 22, and an interworking point 26. Other embodiments of network 10 may be used without departing from the scope of the present invention. In the illustrated embodiment, public network 11 includes a home location register (HLR) 28.

In one aspect of operation, private network 10 provides GPRS services to mobile stations 12. Private network 10 may, for example, be part of an enterprise's internal communications network. The services provided to mobile stations 12 may be controlled by the operator of private network 10. As a result, private network 10 may offer different services to mobile stations 12 than the services offered by public network 11. Mobile station 12 may receive one set of services while communicating with public network 11 and receive customized services while communicating with private network 10.

Two planes of operation may be used to transport messages through private network 10. One plane is a transmission plane, and the other plane is a signaling plane. The transmission plane carries bearer messages that contain voice or data traffic. The signaling plane carries signaling messages used to control the transmission plane in private network 10. The signaling messages include mobility management messages used to track the location of a mobile station 12, which allows mobile stations 12 to roam within private network 10 and between public network 11 and private network 10.

Mobile station 12 communicates with a base station 14 over a wireless interface 30. Mobile station 12 provides voice and/or data services to a subscriber. Mobile station 12 may communicate with base station 14 using any suitable circuit-switched or packet-switched communications protocol. Mobile station 12 may comprise any device operable to communicate with network 10 over wireless interface 30. For example, mobile station 12 may comprise a mobile telephone or a computer or personal digital assistant coupled to a wireless modem or radio unit. In a particular embodiment, mobile station 12 comprises a Global System for Mobile communication (GSM) mobile handset. Other embodiments of mobile station 12 may be used without departing from the scope of the present invention.

Base station 14 is coupled to access point 16. In this document, the term "couple" refers to any direct or indirect communication between two or more elements, whether or not the elements are in physical contact with one another. Base station 14 provides bi-directional communication with mobile stations 12 in a specified geographic area over wireless interface 30. Base station 14 also transfers messages between mobile station 12 and access point 16. Base station 14 may comprise any device operable to communicate with mobile station 12 over wireless interface 30. Base station 14 may, for example, comprise one or more transceivers operable to exchange circuit-switched or packet-switched messages with mobile station 12. In one embodiment, base station 14 and mobile station 12 communicate using GSM communications protocols.

Wireless interface 30 couples mobile station 12 and base station 14. In this document, the term "wireless" designates the use of a radio or over-the-air interface between mobile station 12 and base station 14. Wireless interface 30 may comprise any interface operable to transfer circuit-switched or packet-switched messages between mobile station 12 and base station 14. In one embodiment, wireless interface 30 comprises a GSM GPRS interface.

Access point 16 is coupled to base stations 14 and packet network 22. Access point 16 facilitates communication between base station 14 and packet network 22. In one embodiment, access point 16 performs an interworking function to convert between a circuit-switched protocol used by mobile station 12 and a packet-switched protocol used by packet network 22. For example, access point 16 may receive circuit-switched messages from mobile station 12 through base station 14, and access point 16 packetizes the messages into data packets. Access point 16 may also receive data packets over packet network 22, and access point 16 depacketizes messages contained in the data packets. Access point 16 may comprise any device operable to facilitate communication between base station 14 and packet network 22. In one embodiment, access point 16 comprises a Wireless Adjunct inteRnet Platform (WARP).

GSN 18 is coupled to packet network 22. GSN 18 facilitates communication to and from mobile stations 12 in private network 10. For example, a GSN 18 may track the location of a mobile station 12, and GSN 18 routes messages for that mobile station 12 to the access point 16 serving mobile station 12. GSN 18 may also perform security and authentication functions to help determine whether a mobile station 12 is authorized to use private network 10. GSN 18 may perform any other functions to support the use of GPRS in network 10. GSN 18 may comprise any suitable device operable to support GPRS services in network 10. In one embodiment, GSN 18 comprises a serving GPRS support node (SGSN), a gateway GPRS support node (GGSN), or a combination SGSN-GGSN in an integrated platform. In another embodiment, network 10 may include multiple GSNs 18, including one or more SGSNs and/or one or more GGSNs. Although GSN 18 is illustrated in FIG. 1 as residing within private network 10, GSN 18 may also reside within public network 11.

In order to communicate with private network 10, mobile station 12 and GSN 18, such as a SGSN and/or a GGSN, activate a packet data protocol (PDP) context for mobile station 12. The PDP context contains mapping and routing information used to transport messages between mobile station 12 and GSN 18. The PDP context may also identify the service or services available to a mobile station 12. A PDP context in HLR 28 in public network 11 may be different from the PDP context used in private network 10. This allows private network 10 to provide one or more different services to mobile station 12. For example, private network 10 may provide a more restrictive set of services to mobile station 12, such as allowing mobile station 12 to communicate with private network 10 only through predefined access points 16. This may allow the private network operator, such as an enterprise, to control the use of private network 10 by its employees.

Private database 20 is coupled to packet network 22. Private database 20 stores information related to mobile stations 12. This information could include a user profile, such as one or more PDP contexts, identifying services that a mobile station 12 may receive within private network 10. For example, the user profile could identify the quality of service that a mobile station 12 may receive in private network 10 and whether the mobile station 12 has access to private network 10. The user profile may identify the same services that mobile station 12 receives in public network 11, or the user profile may identify a different set of services. Private database 20 may comprises any device operable to store and facilitate retrieval of user profile information. Although private database 20 is illustrated in FIG. 1 as residing within private network 10, private database 20 may reside at any location that is accessible by private network 10.

In one embodiment, access point 16 and/or GSN 18 terminates application-level information in private network 10. This information includes, for example, the location of mobile station 12 and subscriber-related information such as user profile information. When a mobile station 12 begins communicating with private network 10, access point 16 and/or GSN 18 retrieves subscriber-related information from private database 20 and HLR 28. HLR 28 may, for example, store a user profile or PDP context identifying services that a mobile station 12 may receive within public network 11. Access point 16 and/or GSN 18 compares the information from private database 20 and the information from HLR 28, and private network 10 provides services to mobile station 12 based on that comparison. This allows the operator of private network 10 to customize a user profile for mobile station 12 that is different in private network 10 than in public network 11. Access point 16 and/or GSN 18 may use the user profiles to identify whether a mobile station 12 has access to private network 10. Access point 16 and/or GSN 18 may also parse the PDP contexts associated with mobile station 12 in the public network 11 and restrict the services available to mobile station 12 in private network 10. For example, access point 16 and/or GSN 18 may control the PDP contexts associated with mobile station 12 and allow mobile station 12 to communicate only with specific access points 16 in private network 10.

Packet network 22 is coupled to access point 16, GSN 18, private database 20, and interworking point 26. Packet network 22 facilitates communication between access point 16, GSN 18, private database 20, and interworking point 26. For example, packet network 22 transports data packets between network addresses in packet network 22. Packet network 22 may also facilitate communication between private network 10 and other private networks 32. In this way, a mobile station 12 may roam from private network 10 into another private network 32, and private network 32 may retrieve the user profile information for mobile station 12 from private database 20 over packet network 22. Packet network 22 may comprise any suitable packet-switched network or networks at one or more locations. In one embodiment, packet network 22 comprises an Internet Protocol (IP) network, such as a Local Area Network (LAN) or a Wide Area Network (WAN). Although FIG. 1 illustrates one packet network 22, multiple packet networks may be used without departing from the scope of the present invention. Also, although FIG. 1 illustrates packet network 22 as residing within private network 10, packet network 22 may also comprise a public packet network, such as the Internet.

Interworking point 26 is coupled to packet network 22 and HLR 28. Interworking point 26 facilitates communication between private network 10 and public network 11. In one embodiment, interworking point 26 communicates over packet network 22 using one communications protocol, and interworking point 26 communicates with public network 11 using another communications protocol. In this embodiment, interworking point 26 performs an interworking function to translate between the different protocols. In a particular embodiment, interworking point 26 communicates IP data packets over packet network 22, interworking point 26 communicates with public network 11 using a Signaling System 7 (SS7) protocol, and interworking point 26 interworks between the different protocols. Although interworking point 26 is illustrated in FIG. 1 as residing within private network 10, interworking point 26 may also reside within public network 11.

Although FIG. 1 illustrates one embodiment of private network 10, numerous changes may be made to network 10 without departing from the scope of the present invention. For example, one or more of GSN 18, packet network 22, and interworking point 26 may reside within one or more public networks 11. Also, private network 10 may include multiple packet networks that perform the functions of packet network 22. Further, private network 10 may include any number of GSNs 18, including one or more SGSNs and one or more GGSNs. In addition, any number of base stations 14 and access points 16 may be used to communicate with mobile stations 12. Other changes may be made without departing from the scope of the present invention.

Figure 2:
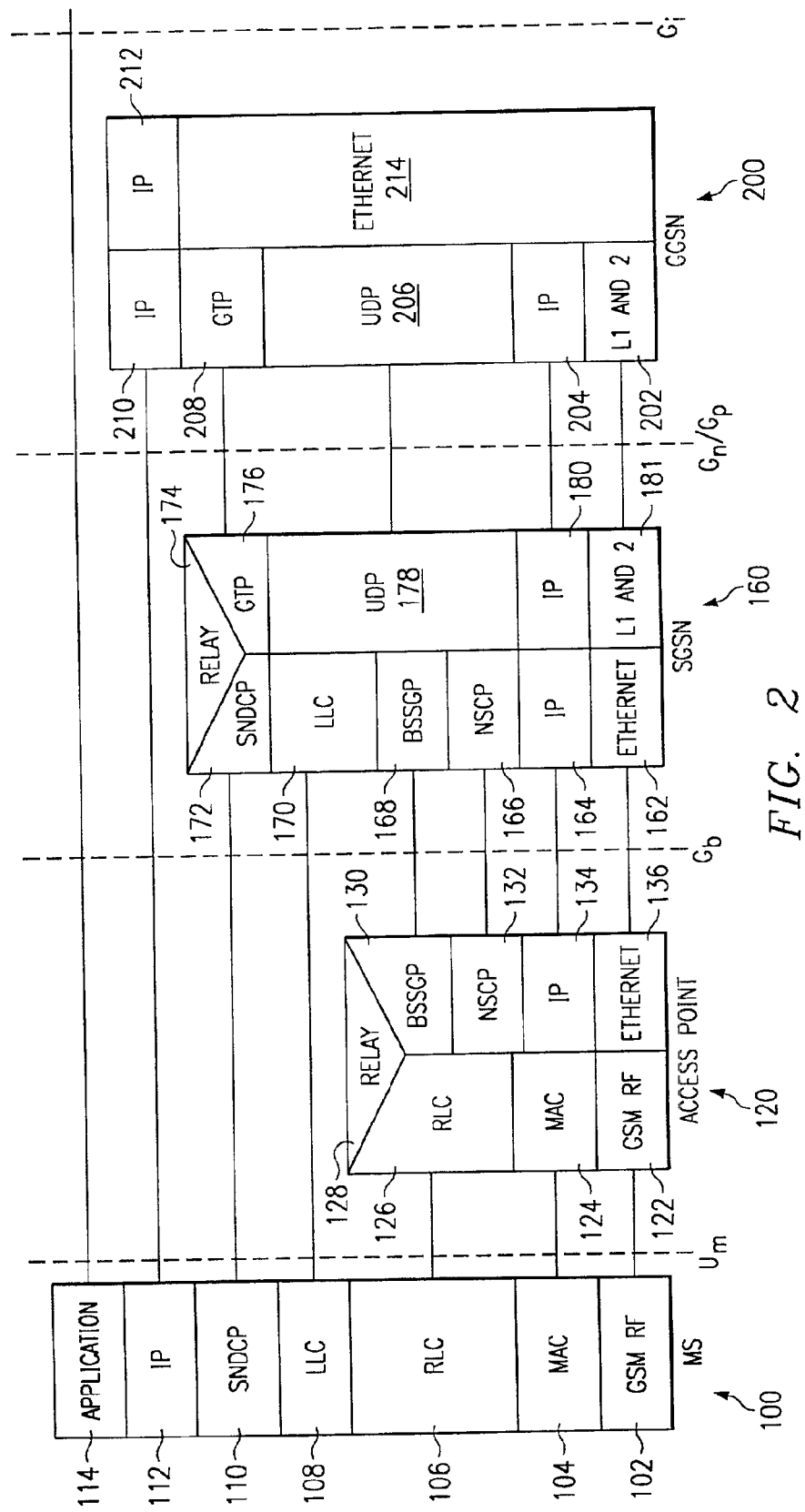
FIG. 2 is a block diagram illustrating a portion of a transmission plane used to transport traffic in the private network.

FIG. 2 is a block diagram illustrating a portion of a transmission plane used to transport traffic in private network 10. In the illustrated embodiment, the transmission plane includes a mobile station protocol stack 100, an access point protocol stack 120, a SGSN protocol stack 160, and a GGSN protocol stack 200. In the illustrated embodiment, the transmission plane includes separate protocol stacks for two GSNs 18, one SGSN and one GGSN. Other embodiments of the transmission plane may be used without departing from the scope of the present invention.

Mobile station protocol stack 100 includes a GSM radio frequency (RF) layer 102, a Medium Access Control (MAC) layer 104, a Radio Link Control (RLC) layer 106, a Logical Link Control (LLC) layer 108, a Sub-Network Dependent Convergence Protocol (SNDCP) layer 110, an Internet Protocol (IP) layer 112, and an application layer 114. Access point protocol stack 120 includes a GSM RF layer 122, a MAC layer 124, a RLC layer 126, a LLC relay layer 128, a Base Station System GPRS Protocol (BSSGP) layer 130, a modified Network Service Control Protocol (NSCP) layer 132, an IP layer 134, and an Ethernet layer 136.

SGSN protocol stack 160 includes an Ethernet layer 162, an IP layer 164, a modified NSCP layer 166, a BSSGP layer 168, a LLC layer 170, a SNDCP layer 172, a LLC relay layer 174, a GPRS Tunneling Protocol (GTP) layer 176, a User Datagram Protocol (UDP) layer 178, an IP layer 180, and a L1 and L2 protocol layer 181. GGSN protocol stack 200 includes a L1 and L2 protocol layer 202, an IP layer 204, a UDP layer 206, a GTP layer 208, two IP layers 210 and 212, and an Ethernet layer 214.

GSM RF layers 102 and 122 manage wireless interface 30 between mobile station 12 and base station 14. In one embodiment, wireless interface 30 comprises a GPRS $U_m$ interface. MAC layers 104 and 124 and RLC layers 106 and 126 support the transfer of information over wireless interface 30. MAC layers 104 and 124 and RLC layers 106 and 126 may, for example, map LLC frames from LLC layers 108 and 170 onto RLC data blocks transmitted over wireless interface 30. LLC layers 108 and 170 provide a reliable ciphered logical link between mobile station 12 and GSN 18. SNDCP layers 110 and 172 map data packets onto LLC frames for transport between terminal unit 12 and GSN 18. SNDCP layers 110 and 172 also provide different quality of service classes to mobile stations 12, and SNDCP layers 110 and 172 perform encryption, header compression, and data compression. IP layers 112, 210, and 212 support packet-switched protocols used by applications executed by mobile station 12. Application layer 114 supports applications executed by mobile station 12.

LLC relay layer 128 in access point 16 supports the transfer of messages between base station 14 and a SGSN 18. LLC relay layer 128 may, for example, facilitate the transport of messages between the $U_m$ interface with base station 14 and a GPRS $G_b$ interface with GSN 18. BSSGP layers 130 and 168 support the transfer of information such as quality-of-service information between access point 16 and GSN 18. Modified NSCP layers 132 and 166 support an interface between BSSGP layers 130 and 168 and IP layers 134 and 164. IP layers 134 and 164 support the transport of information between access point 16 and GSN 18 in data packets over packet network 22. Ethernet layers 136 and 162 support the physical transmission interface between access point 16 and GSN 18. In one embodiment, access point 16 and GSN 18 communicate over a GPRS $G_b$ interface.

LLC relay layer 174 in SGSN 18 supports the transfer of messages between access point 16 and a GGSN 18. LLC relay layer 174 transports messages between the $G_b$ interface with access point 16 and a GPRS $G_n$ or a GPRS $G_p$ interface with another GSN 18. GTP layers 176 and 208 support the transport of bearer and signaling messages from one GSN 18 to another GSN 18. UDP layers 178 and 206 and IP layers 180 and 204 support the transport of the bearer and signaling messages over UDP/IP connections. L1 and L2 protocol layers 181 and 202 support the management of the physical transmission interface between GSNs 18. In one embodiment, GSNs 18 communicate over a GPRS $G_n$ or a GPRS $G_p$ interface. Ethernet layer 214 supports the management of the physical transmission interface between GSN 18 and an external packet network. In one embodiment, GSN 18 communicates with the public packet network over a GPRS $G_i$ interface.

The various layers in the components of private network 10 may be implemented in any hardware, software, firmware, or combination thereof that is operable to perform the described functions in private network 10. In one embodiment, the various layers comprise software components. Other embodiments may be used without departing from the scope of the present invention.

Figure 3:
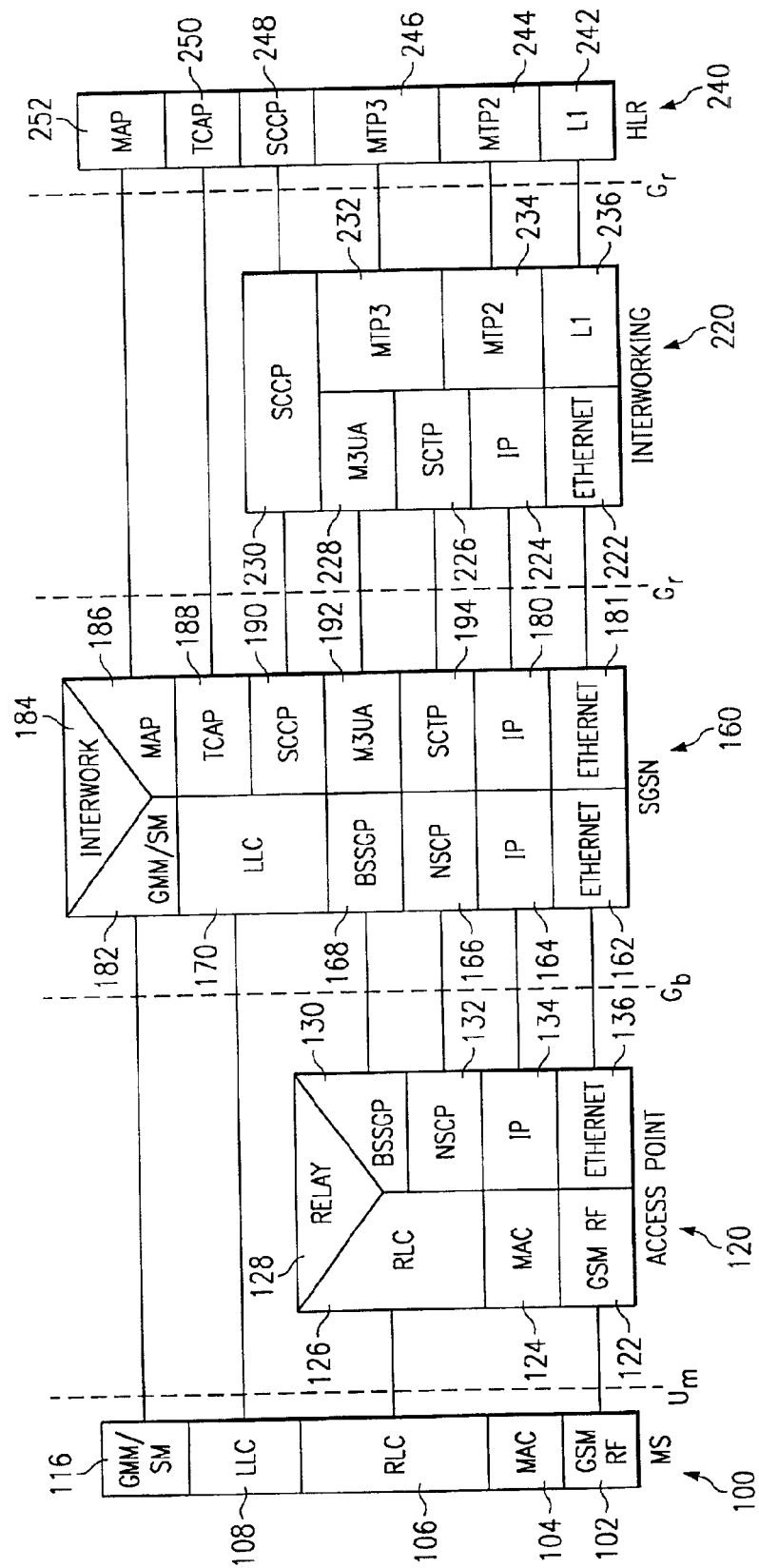
FIG. 3 is a block diagram illustrating a portion of a signaling plane used to allow a mobile station to roam within the private network.

FIG. 3 is a block diagram illustrating a portion of a signaling plane used to allow mobile station 12 to roam within private network 10. In the illustrated embodiment, the signaling plane includes mobile station protocol stack 100, access point protocol stack 120, SGSN protocol stack 160, an interworking point protocol stack 220, and a HLR protocol stack 240. Other embodiments of the signaling plane may be used without departing from the scope of the present invention.

Mobile station protocol stack 100 further includes a GPRS Mobility Management and Session Management (GMM/SM) layer 116. SGSN protocol stack 160 further includes a GMM/SM layer 182, an interworking function layer 184, a Mobile Application Part (MAP) protocol layer 186, a Transaction Capability Application Part (TCAP) layer 188, a Signaling Connection Control Part (SCCP) layer 190, a MTP-3 User Adaptation (M3UA) layer 192, and a Stream Control Transmission Protocol (SCTP) layer 194.

Interworking point protocol stack 220 includes an Ethernet layer 222, an IP layer 224, a SCTP layer 226, a M3UA layer 228, a SCCP layer 230, a Message Transfer Part-3 (MTP3) layer 232, a Message Transfer Part-2 (MTP2) layer 234, and a L1 layer 236, HLR protocol stack 240 includes a L1 layer 242, a MTP2 layer 244, a MTP3 layer 246, a SCCP layer 248, a TCAP layer 250, and a MAP layer 252.

GMM/SM layers 116 and 182 support mobility management functions in private network 10, such as tracking the location of each mobile station 12. Interworking function layer 184 supports the interworking of different signaling protocols used by mobile station 12 and HLR 28. In one embodiment, mobile station 12 uses the GPRS Mobility Management protocol, HLR 28 uses a Mobile Application Part protocol, and interworking function layer 184 supports the interworking of the protocols.

MAP protocol layers 186 and 252 support the exchange of signaling messages between GSN 18 and HLR 28 using the MAP protocol. TCAP layers 188 and 250 support the protocols used in the transmission of TCAP messages between GSN 18 and HLR 28. SCCP layers 190, 230, and 248 support the protocols used to transport SCCP messages between GSN 18 and HLR 28 through interworking point 26. M3UA layers 192 and 228 support the communication of MTP-3 signaling messages between GSN 18 and interworking point 26. SCTP layers 194 and 226 provide a reliable transport mechanism for transporting signaling messages between GSN 18 and interworking point 26. IP layers 180 and 224 support the transport of IP data packets containing the signaling messages between GSN 18 and interworking point 26 over packet network 22. Ethernet layers 181 and 222 support the management of the physical transmission interface between GSN 18 and interworking point 26. In one embodiment, GSN 18 communicates with interworking point 26 over a GPRS $G_r$ interface.

MTP3 layers 232 and 246 and MTP2 layers 234 and 244 support the transmission protocols used to route signaling messages between interworking point 26 and HLR 28. L1 layers 236 and 242 support the management of the physical transmission interface between interworking point 26 and HLR 28. In one embodiment, interworking point 26 communicates with HLR 28 over a GPRS $G_r$ interface.

Figure 4:
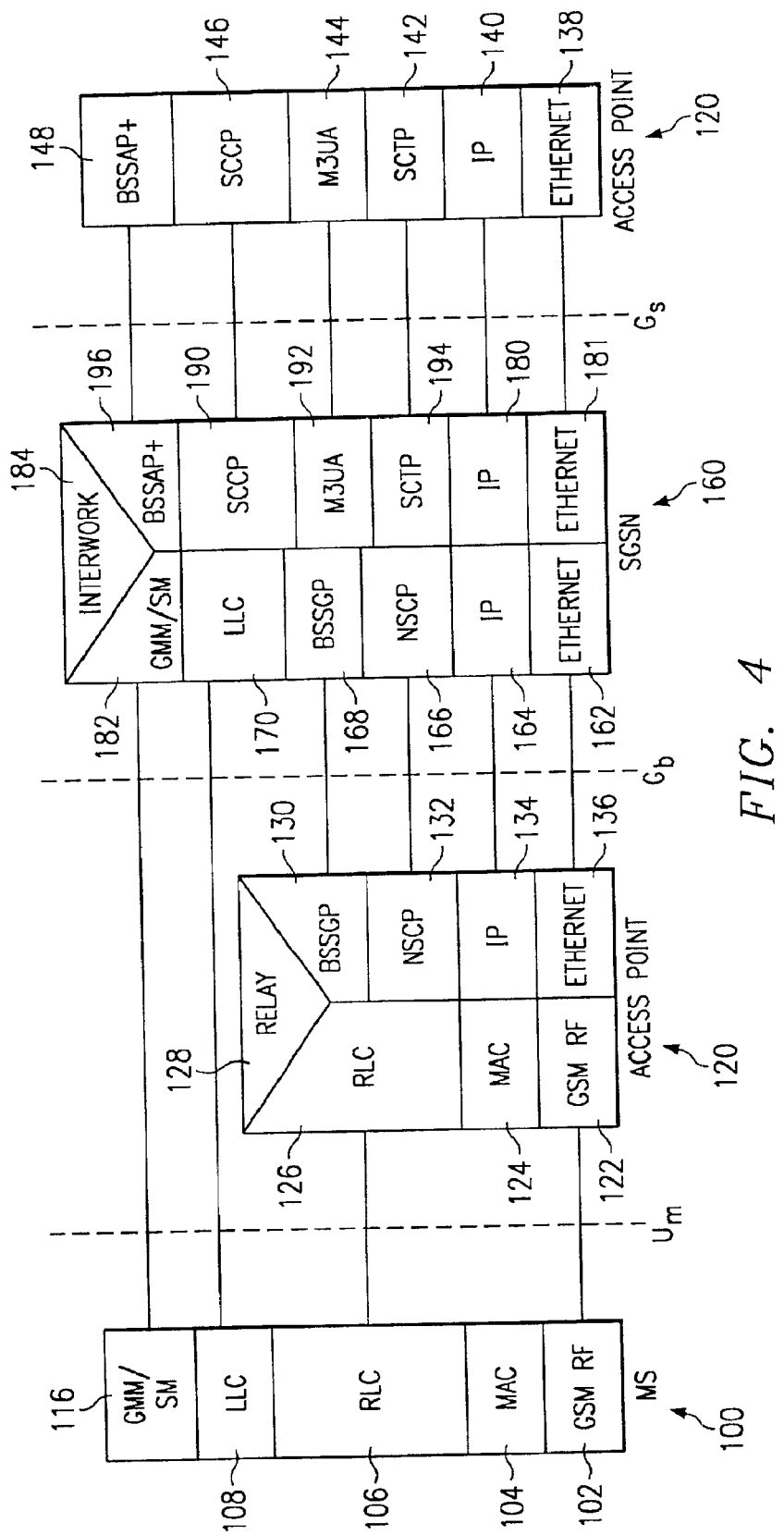
FIG. 4 is a block diagram illustrating another portion of the signaling plane used to allow a mobile station to roam within the private network.

FIG. 4 is a block diagram illustrating another portion of the signaling plane used to allow mobile station 12 to roam within private network 10. In the illustrated embodiment, access point protocol stack 120 further includes an Ethernet layer 138, an IP layer 140, a SCTP layer 142, a M3UA layer 144, a SCCP layer 146, and a Base Station System Application Part+ (BSSAP+) layer 148. SGSN protocol stack 160 also further includes a BSSAP+ layer 196. Other embodiments of the signaling plane may be used without departing from the scope of the present invention.

BSSAP+ layers 196 and 148 support the paging of mobile stations 12 in private network 10. BSSAP+ layers 196 and 148 also support location updating functions in private network 10, allowing GSN 18 to monitor the location of each mobile station 12. In this embodiment, interworking function layer 184 also interworks between the GMM/SM protocol and the BSSAP+ protocol. SCCP layers 190 and 146 support the protocols used to transport SCCP messages between GSN 18 and access point 16. M3UA layers 192 and 146 support the transport of MTP-3 signaling messages between GSN 18 and access point 16. SCTP layers 194 and 142 provide a reliable transport mechanism for transporting signaling messages between GSN 18 and access point 16. IP layers 180 and 140 support the transport of IP data packets containing the signaling messages between GSN 18 and access point 16 over packet network 22. Ethernet layers 181 and 138 support the management of the physical transmission interface between GSN 18 and access point 16. In one embodiment, GSN 18 communicates with access point 16 over a GPRS $G_s$ interface.

Figure 5:
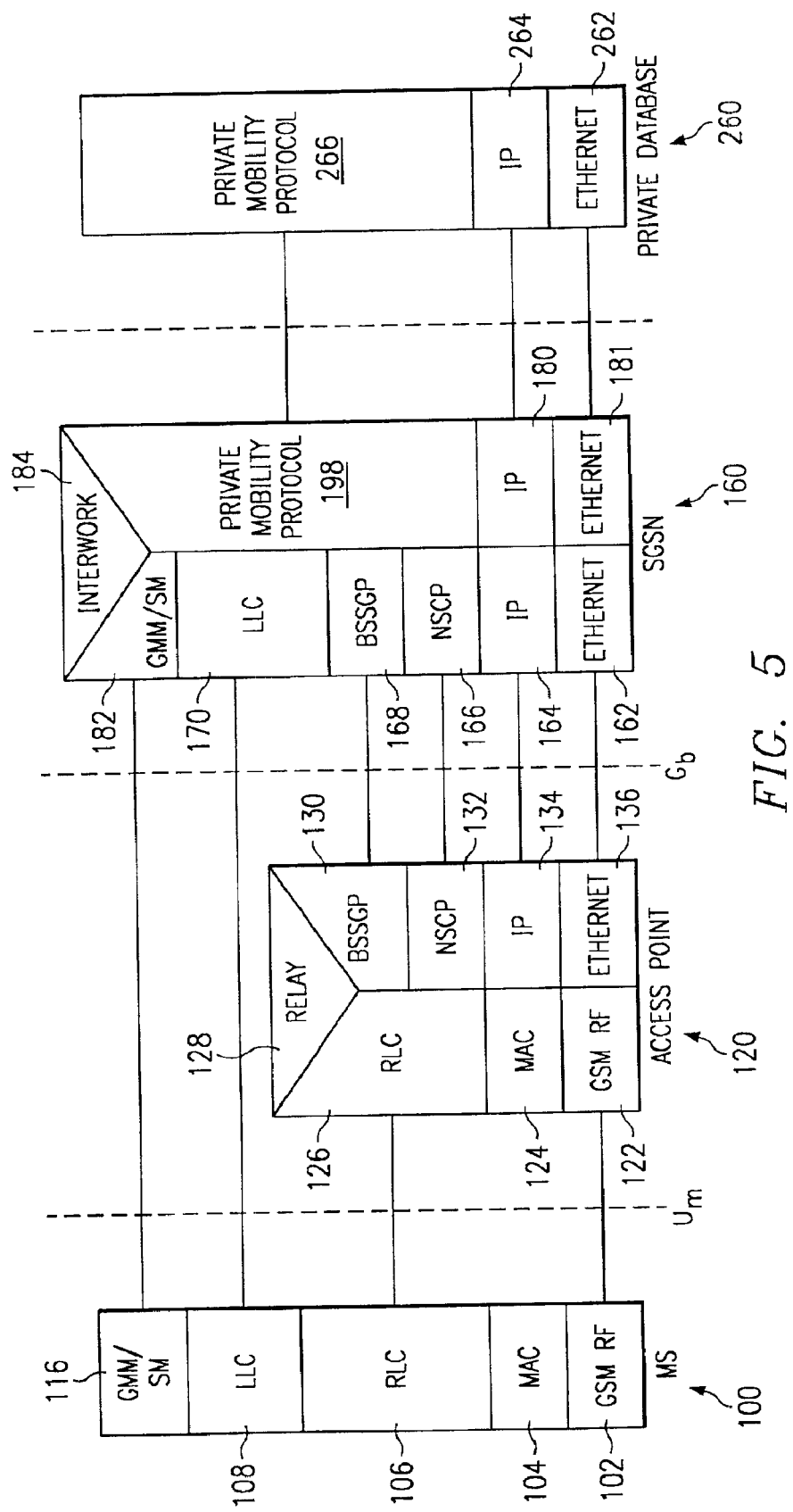
FIG. 5 is a block diagram illustrating a portion of the signaling plane used to allow a GPRS support node to retrieve user profile information from a private database in the private network.

FIG. 5 is a block diagram illustrating a portion of the signaling plane used to allow GSN 18 to retrieve user profile information from private database 20 in private network 10. In the illustrated embodiment, the signaling plane further includes a private database protocol stack 260. Other embodiments of the signaling plane may be used without departing from the scope of the present invention.

SGSN protocol stack 160 further includes a private mobility protocol layer 198. Private database protocol stack 260 includes an Ethernet layer 262, an IP layer 264, and a private mobility protocol layer 266.

Ethernet layers 181 and 262 support the management of the physical transmission interface between GSN 18 and private database 20. IP layers 180 and 264 support the transport of IP data packets between GSN 18 and private database 20 over packet network 22. Private mobility protocol layers 198 and 266 support the transfer of information between private database 20 and GSN 18. For example, private mobility protocol layers 198 and 266 may support the transfer of user profile information from private database 20 to GSN 18 when a mobile station 12 registers with private network 10. Private mobility protocol layers 198 and 266 may comprise any suitable communications protocol operable to allow subscriber-related information to be transported between private database 20 and GSN 18 over packet network 22. In this embodiment, interworking function layer 184 also interworks between the GMM/SM protocol and the private mobility protocol.

Figure 6:
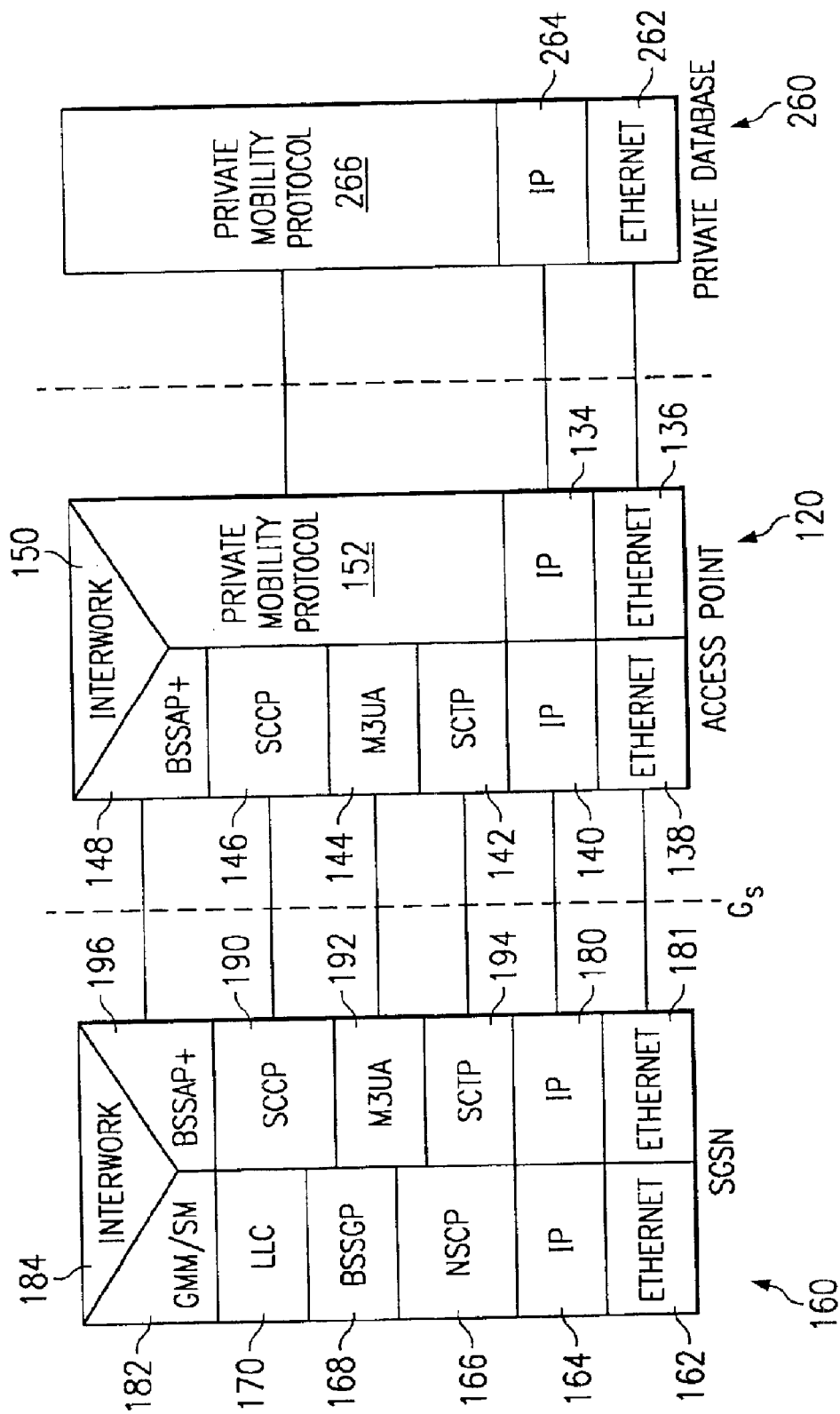
FIG. 6 is a block diagram illustrating a portion of the signaling plane used to allow an access point to retrieve user profile information from the private database in the private network.

FIG. 6 is a block diagram illustrating a portion of the signaling plane used to allow access point 16 to retrieve user profile information from private database 20 in private network 10. In the illustrated embodiment, access point protocol stack 120 further includes an interworking function layer 150 and a private mobility protocol layer 152. Other embodiments of the signaling plane may be used without departing from the scope of the present invention.

Ethernet layers 136 and 262 support the management of the physical transmission interface between access point 16 and private database 20. IP layers 134 and 264 support the transport of IP data packets between access point 16 and private database 20 over packet network 22. Private mobility protocol layers 152 and 266 support the transfer of information, such as user profile information, from private database 20 to access point 16. Interworking function layer 150 interworks between the BSSAP+ protocol and the private mobility protocol.

Figures 7, 8:
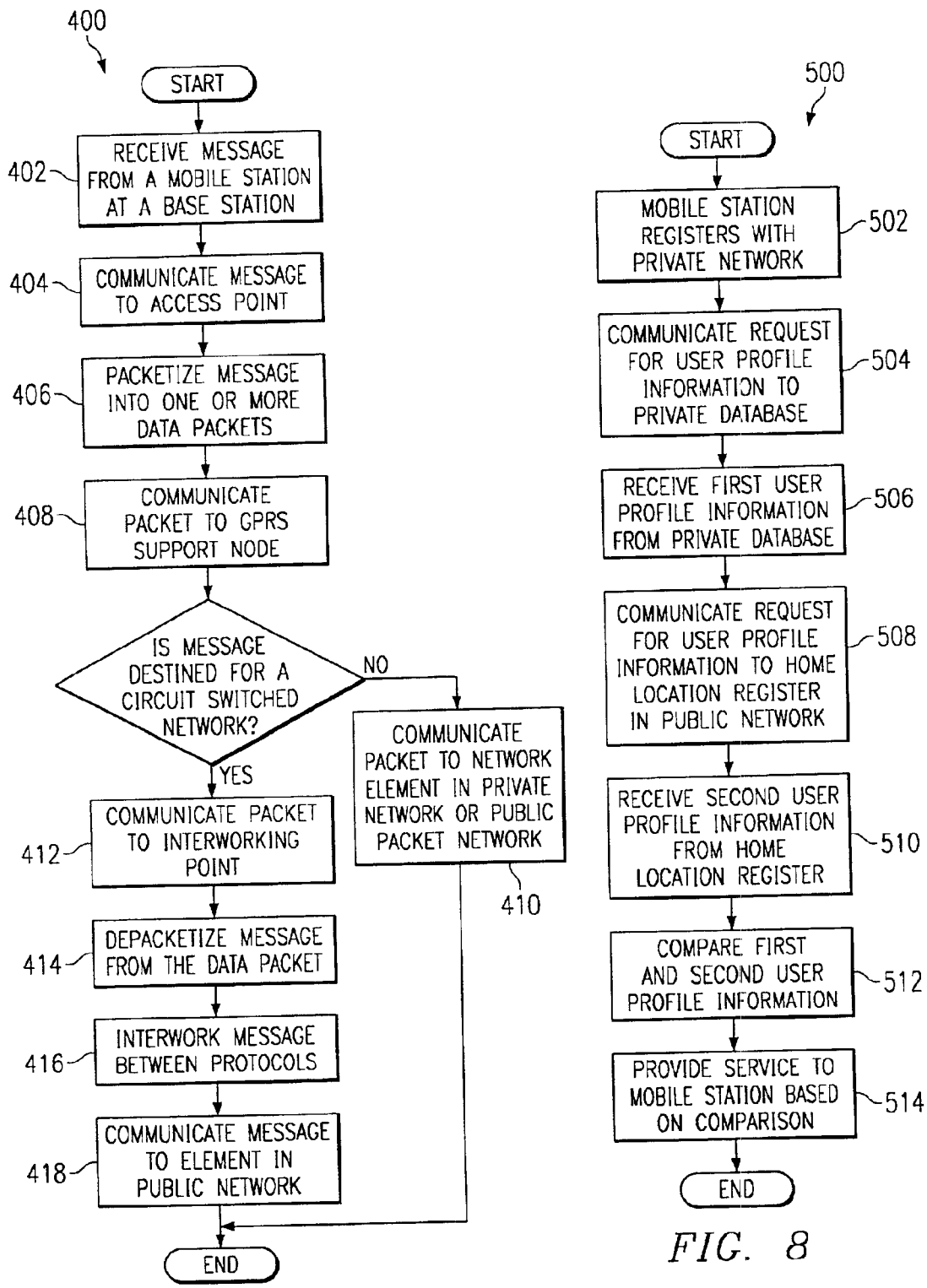
FIG. 7 is a flowchart illustrating a method for providing GPRS in the private network.
FIG. 8 is a flowchart illustrating a method for providing custom GPRS services in a private network.

FIG. 7 is a flowchart illustrating a method 400 for providing GPRS services in a private network. Private network 10 receives a message from mobile station 12 at a step 402. This may include, for example, base station 14 receiving a circuit-switched or packet-switched message from mobile station 12 over wireless interface 30. Base station 14 communicates the message to access point 16 at a step 404. Access point 16 packetizes the message at a step 406. This may include, for example, access point 16 placing the message from mobile station 12 into one or more data packets. Access point 16 communicates the message to GSN 18 at a step 408. This may include, for example, access point 16 routing the data packet to GSN 18 over packet network 22.

If the message from mobile station 12 is destined for a network element within private network 10 or a public packet network, GSN 18 communicates the data packet to the other network element at a step 410. This may include, for example, GSN 18 communicating the message to another access point 16 or to another GSN 18 in private network 10. This may also include communicating the message to an external network coupled to packet network 22, such as the Internet. In this embodiment, private network 10 may include multiple GSNs 18, where one is a SGSN and one is a GGSN. To communicate a message to the external network, the SGSN receives the data packet from access point 16 and communicates the packet to the GGSN, which communicates the packet to the external network.

If the message from mobile station 12 is not destined for a network element within private network 10 or a public packet network, GSN 18 routes the message to interworking point 26 at a step 412. This may include, for example, GSN 18 routing the message over packet network 22. Interworking point 26 depacketizes the message contained in the data packets at a step 414. Interworking point 26 interworks the message between a first protocol and a second protocol at a step 416. In one embodiment, interworking point 26 communicates with packet network 22 using a M3UA protocol and with public network 11 using a SS7 MTP protocol. Interworking point 26 performs an interworking function to convert between these protocols. Interworking point 26 routes the message to public network 11 at a step 418. This may include, for example, interworking point 26 communicating the message to HLR 28 in public network 11.

FIG. 8 is a flowchart illustrating a method 500 for providing custom GPRS services in a private network. Although FIG. 8 describes method 500 with respect to GSN 18, the same or similar method may be used by access point 16 in private network 10.

A mobile station 12 registers with private network 10 at a step 502. This may include, for example, mobile station 12 communicating a request for registration to base station 14, and the request may include information identifying mobile station 12. This may also include base station 14 communicating the information to GSN 18 through access point 16.

GSN 18 communicates a request for user profile information to private database 20 at a step 504. This may include, for example, GSN 18 performing an interworking function to translate the request from mobile station 12 between different mobility management protocols. In a particular embodiment, GSN 18 interworks between the GPRS Mobility Management protocol used by mobile station 12 and the private mobility protocol used by private database 20. GSN 18 receives first user profile information from private database 20 at a step 506.

GSN 18 also requests user profile information from HLR 28 in public network 11 at a step 508. This may include, for example, GSN 18 performing an interworking function to translate the request from mobile station 12 between different mobility management protocols. In a particular embodiment, GSN 18 translates between the GPRS Mobility Management protocol and the Mobile Application Part protocol used by HLR 28. This may also include GSN 18 communicating the request to HLR 28 over packet network 22 and through interworking point 26. GSN 18 receives second user profile information from HLR 28 at a step 510.

GSN 18 compares the first and second user profile information at a step 512. This may include, for example, GSN 18 comparing different PDP contexts for a mobile station 12 from private network 10 and public network 11. This may also include determining whether mobile station 12 is allowed to access private network 10. Using the results of the comparison, GSN 18 provides GPRS services to mobile station 12 at a step 514. This may include GSN 18 parsing the PDP contexts associated with mobile station 12 in public network 11 and restricting the services available to mobile station 12 in private network 10. For example, GSN 18 may control the PDP contexts associated with mobile station 12 and allow mobile station 12 to communicate only with specific access points 16 in private network 10. The ability to control the PDP contexts allows private network 10 to control the services available to mobile station 12, which provides private network 10 with the ability to implement security and accounting methods within private network 10.

Although an embodiment of the invention and its advantages are described in detail, a person skilled in the art could make various alternations, additions, and omissions without departing from the spirit and scope of the present invention as defined by the appended claims.

What is claimed is:

1. A system for providing general packet radio services (GPRS) to a mobile station, comprising:
    a packet network operable to transport packets of information;
    a database coupled to the packet network and operable to store profile information associated with the mobile station;
    a base station operable to communicate with the mobile station over a wireless interface;
    an access point coupled to the base station and to the packet network, the access point operable to communicate with the mobile station through the base station;
    a GPRS support node coupled to the packet network and operable to communicate with the access point, the GPRS support node also operable to monitor a location of the mobile station and to route packets of information for the mobile station to the access point; and
    an interworking point coupled to the packet network, the interworking point operable to communicate with the GPRS support node using a first protocol and with a public network using a second protocol, the interworking point also operable to interwork between the first protocol and the second protocol;
    wherein the profile information identifies one or more services available to the mobile station in the system; and
    wherein at least one of the services available to the mobile station in the system is different from the services available to the mobile station in the public network.

2. The system of claim 1, wherein the packet network comprises an Internet Protocol network.

3. The system of claim 1, wherein the profile information comprises first profile information; and
    wherein the public network comprises a home location register operable to store second profile information associated with the mobile station.

4. The system of claim 3, wherein the GPRS support node is operable to retrieve the first and second profile information, compare the first and second profile information, and provide GPRS service to the mobile station based on the comparison.

5. The system of claim 1, wherein the access point and the GPRS support node each comprises:
    an Internet Protocol layer operable to facilitate communication over the packet network; and
    a Network Services Control Protocol layer operable to provide an interface between the Internet Protocol layer and a Base Station System GPRS Protocol layer.

6. The system of claim 1, wherein the packet network is further coupled to a second private network.

7. The system of claim 1, wherein the GPRS support node comprises a serving GPRS support node (SGSN); and
    further comprising a gateway GPRS support node (GGSN) coupled to the packet network and to an external packet network, the GGSN operable to transmit packets to and receive packets from the SGSN.

8. A system for providing general packet radio services (GPRS) to a mobile station, comprising:
    a packet network operable to transport packets of information;
    a database coupled to the packet network and operable to store first profile information associated with the mobile station;
    a base station operable to communicate with the mobile station over a wireless interface;
    an access point coupled to the base station and to the packet network, the access point operable to communicate with the mobile station through the base station;
    a GPRS support node coupled to the packet network and operable to communicate with the access point, the GPRS support node also operable to monitor a location of the mobile station and to route packets of information for the mobile station to the access point;
    an interworking point coupled to the packet network, the interworking point operable to communicate with the GPRS support node using a first protocol and with a public network using a second protocol, the interworking point also operable to interwork between the first protocol and the second protocol;

wherein the public network comprises a home location register operable to store second profile information associated with the mobile station; and wherein the access point is operable to retrieve the first and second profile information, compare the first and second profile information, and provide GPRS service to the mobile station based on the comparison.

9. A system for providing general packet radio services (GPRS) to a mobile station, comprising:

a packet network operable to transport packets of information;

a database coupled to the packet network and operable to store profile information associated with the mobile station;

a base station operable to communicate with the mobile station over a wireless interface;

an access point coupled to the base station and to the packet network, the access point operable to communicate with the mobile station through the base station;

a GPRS support node coupled to the packet network and operable to communicate with the access point, the GPRS support node also operable to monitor a location of the mobile station and to route packets of information for the mobile station to the access point;

an interworking point coupled to the packet network, the interworking point operable to communicate with the GPRS support node using a first protocol and with a public network using a second protocol, the interworking point also operable to interwork between the first protocol and the second protocol; and wherein the access point and the GPRS support node each comprises:
an Internet Protocol layer operable to facilitate communication over the packet network;
a Message Transfer Part-3 (MTP-3) User Adaptation protocol layer operable to facilitate generation of MTP-3 messages; and
a Stream Control Transmission Protocol layer operable to facilitate communication of the MTP-3 messages.

10. A system for providing general packet radio services (GPRS) to a mobile station, comprising:

a packet network operable to transport packets of information;

a database coupled to the packet network and operable to store profile information associated with the mobile station;

a base station operable to communicate with the mobile station over a wireless interface;

an access point coupled to the base station and to the packet network, the access point operable to communicate with the mobile station through the base station;

a GPRS support node coupled to the packet network and operable to communicate with the access point, the GPRS support node also operable to monitor a location of the mobile station and to route packets of information for the mobile station to the access point;

an interworking point coupled to the packet network, the interworking point operable to communicate with the GPRS support node using a first protocol and with a public network using a second protocol, the interworking point also operable to interwork between the first protocol and the second protocol; and wherein the GPRS support node and the interworking point each comprises:
an Internet Protocol layer operable to facilitate communication over the packet network;
a Message Transfer Part-3 (MTP-3) User Adaptation protocol layer operable to facilitate generation of MTP-3 messages; and
a Stream Control Transmission Protocol layer operable to facilitate communication of the MTP-3 messages.

11. A system for providing general packet radio services (GPRS) to a mobile station, comprising:

a packet network operable to transport packets of information;

a database coupled to the packet network and operable to store profile information associated with the mobile station;

a base station operable to communicate with the mobile station over a wireless interface;

an access point coupled to the base station and to the packet network, the access point operable to communicate with the mobile station through the base station;

a GPRS support node coupled to the packet network and operable to communicate with the access point, the GPRS support node also operable to monitor a location of the mobile station and to route packets of information for the mobile station to the access point;

an interworking point coupled to the packet network, the interworking point operable to communicate with the GPRS support node using a first protocol and with a public network using a second protocol, the interworking point also operable to interwork between the first protocol and the second protocol; and wherein the access point and the GPRS support node each comprise:
an Internet Protocol layer operable to facilitate communication over the packet network; and
a mobility protocol layer operable to facilitate communication with the database.

12. A system for providing general packet radio services (GPRS) to a mobile station, comprising:

a base station operable to communicate with the mobile station over a wireless interface;

an access point coupled to the base station, the access point operable to communication with the mobile station through the base station, the access point also operable to communicate over a packet network;

a database operable to communicate with the access point over the packet network, the database also operable to store profile information associated with the mobile station, the database further operable to communicate the profile information to the access point and to a GPRS support node, the GPRS support node operable to transmit packets of information to and receive packets from the access point over the packet network, the GPRS support node also operable to communicate with a public network through an interworking point, the interworking point operable to communicate with the GPRS support node using a first protocol and with the public network using a second protocol and to interwork between the first protocol and the second protocol;

wherein the profile information identifies one or more services available to the mobile station in the system; and wherein at least one of the services available to the mobile station in the system is different from the services available to the mobile station in the public network.

13. The system of claim 12, further comprising the packet network coupled to the access point, the GPRS support node, the database, and the interworking point.

14. The system of claim 12, wherein the profile information comprises first profile information; and
wherein the public network comprises a home location register operable to store second profile information associated with the mobile station.

15. The system of claim 12, further comprising the GPRS support node coupled to the packet network.

16. The system of claim 15, wherein the access point and the GPRS support node each comprises:
an Internet Protocol layer operable to facilitate communication over the packet network; and
a Network Services Control Protocol layer operable to provide an interface between the Internet Protocol layer and a Base Station System GPRS Protocol layer.

17. The system of claim 15, further comprising the interworking point coupled to the packet network.

18. The system of claim 15, wherein the GPRS support node comprises a serving GPRS support node (SGSN); and
further comprising a gateway GPRS support node (GGSN) coupled to the packet network and to an external packet network, the GGSN operable to transmit data packets to and receive data packets from the SGSN.

19. A system for providing general packet radio services (GPRS) to a mobile station, comprising:
a base station operable to communicate with the mobile station over a wireless interface;
an access point coupled to the base station, the access point operable to communicate with the mobile station through the base station, the access point also operable to communicate over a packet network;
a database operable to communicate with the access point over the packet network, the database also operable to store first profile information associated with the mobile station, the database further operable to communicate the first profile information to the access point and to a GPRS support node, the GPRS support node operable to transmit packets of information to and receive packets from the access point over the packet network, the GPRS support node also operable to communicate with a public network through an interworking point, the interworking point operable to communicate with the GPRS support node using a first protocol and with the public network using a second protocol and to interwork between the first protocol and the second protocol;
wherein the public network comprises a home location register operable to store second profile information associated with the mobile station; and
wherein the access point is operable to retrieve the first and second profile information, compare the first and second profile information, and provide GPRS service to the mobile station based on the comparison.

20. A system for providing general packet radio services (GPRS) to a mobile station, comprising:
a base station operable to communicate with the mobile station over a wireless interface;
an access point coupled to the base station, the access point operable to communicate with the mobile station through the base station, the access point also operable to communicate over a packet network;
a database operable to communicate with the access point over the packet network, the database also operable to store first profile information associated with the mobile station, the database further operable to communicate the first profile information to the access point and to a GPRS support node, the GPRS support node operable to transmit packets of information to and receive packets from the access point over the packet network, the GPRS support node also operable to communicate with a public network through an interworking point, the interworking point operable to communicate with the GPRS support node using a first protocol and with the public network using a second protocol and to interwork between the first protocol and the second protocol;
wherein the public network comprises a home location register operable to store second profile information associated with the mobile station; and
wherein the GPRS support node is operable to retrieve the first and second profile information, compare the first and second profile information, and provide GPRS service to the mobile station based on the comparison.

21. A system for providing general packet radio services (GPRS) to a mobile station, comprising:
a base station operable to communicate with the mobile station over a wireless interface;
an access point coupled to the base station, the access point operable to communicate with the mobile station through the base station, the access point also operable to communicate over a packet network;
a database operable to communicate with the access point over the packet network, the database also operable to store profile information associated with the mobile station, the database further operable to communicate the profile information to the access point and to a GPRS support node, the GPRS support node operable to transmit packets of information to and receive packets from the access point over the packet network, the GPRS support node also operable to communicate with a public network through an interworking point, the interworking point operable to communicate with the GPRS support node using a first protocol and with the public network using a second protocol and to interwork between the first protocol and the second protocol, the GPRS support node coupled to the packet network;
wherein the profile information identifies one or more services available to the mobile station in the system; and
wherein the access point and the GPRS support node each comprises:
an Internet Protocol layer operable to facilitate communication over the packet network;
a Message Transfer Part-3 (MTP-3) User Adaptation protocol layer operable to facilitate generation of MTP-3 messages; and
a Stream Control Transmission Protocol layer operable to facilitate communication of the MTP-3 messages.

22. A system for providing general packet radio services (GPRS) to a mobile station, comprising:
a base station operable to communicate with the mobile station over a wireless interface;
an access point coupled to the base station, the access point operable to communicate with the mobile station through the base station, the access point also operable to communicate over a packet network;
a database operable to communicate with the access point over the packet network, the database also operable to store profile information associated with the mobile station, the database further operable to communicate the profile information to the access point and to a GPRS support node, the GPRS support node operable to transmit packets of information to and receive packets from the access point over the packet network, the GPRS support node also operable to communicate with a public network through an interworking point, the interworking point operable to communicate with the GPRS support node using a first protocol and with the public network using a second protocol and to interwork between the first protocol and the second protocol, the interworking point coupled to the packet network, the GPRS support node coupled to the packet network;

wherein the profile information identifies one or more services available to the mobile station in the system; and wherein the GPRS support node and the interworking point each comprises:
- an Internet Protocol layer operable to facilitate communication over the packet network;
- a Message Transfer Part-3 (MTP-3) User Adaptation protocol layer operable to facilitate generation of MTP-3 messages; and
- a Stream Control Transmission Protocol layer operable to facilitate communication of the MTP-3 messages.

23. A system for providing general packet radio services (GPRS) to a mobile station, comprising:
- a base station operable to communicate with the mobile station over a wireless interface;
- an access point coupled to the base station, the access point operable to communicate with the mobile station through the base station, the access point also operable to communicate over a packet network;
- a database operable to communicate with the access point over the packet network, the database also operable to store profile information associated with the mobile station, the database further operable to communicate the profile information to the access point and to a GPRS support node, the GPRS support node operable to transmit packets of information to and receive packets from the access point over the packet network, the GPRS support node also operable to communicate with a public network through an interworking point, the interworking point operable to communicate with the GPRS support node using a first protocol and with the public network using a second protocol and to interwork between the first protocol and the second protocol, the GPRS support node coupled to the packet network;

wherein the profile information identifies one or more services available to the mobile station in the system; and wherein the access point and the GPRS support node each comprises:
- an Internet Protocol layer operable to facilitate communication over the packet network;
- a mobility protocol layer operable to facilitate communication with the database.

24. A method for providing general packet radio services (GPRS) to a mobile station in a private network, comprising:
- receiving a registration request from the mobile station;
- receiving from a database first profile information associated with the mobile station, the first profile information also associated with the private network;
- receiving from a public network second profile information associated with the mobile station;
- comparing the first and second profile information; and
- providing GPRS service to the mobile station based on the comparison.

25. The method of claim 24, wherein receiving a registration request from the mobile station comprises receiving a registration request from the mobile station using a first protocol; and further comprising interworking the request between the first protocol and a second protocol.

26. The method of claim 25, wherein the first protocol comprises a GPRS Mobility Management protocol.

27. The method of claim 25, wherein the second protocol comprises a mobility protocol used by the database.

28. The method of claim 25, wherein the second protocol comprises a Mobile Application Part protocol used by a home location register in the public network.

29. The method of claim 24, wherein the first profile information identifies one or more services available to the mobile station in the private network; and wherein the second profile information identifies one or more services available to the mobile station in the public network.

30. The method of claim 29, wherein at least one of the services available to the mobile station in the private network is different from the services available to the mobile station in the public network.

31. The method of claim 24, wherein an access point receives the first and second profile information.

32. The method of claim 24, wherein a GPRS support node receives the first and second profile information.

33. An access point for providing General Packet Radio Services (GPRS) to a mobile station, comprising:
- an Internet Protocol layer operable to facilitate communication over a packet network;
- a Message Transfer Part-3 (MTP-3) User Adaptation protocol layer operable to facilitate generation of MTP-3 messages; and
- a Stream Control Transmission Protocol layer operable to facilitate communication of the MTP-3 messages.

34. A General Packet Radio Services (GPRS) support node for providing GPRS services to a mobile station, comprising:
- an Internet Protocol layer operable to facilitate communication over a packet network;
- a Message Transfer Part-3 (MTP-3) User Adaptation protocol layer operable to facilitate generation of MTP-3 messages; and
- a Stream Control Transmission Protocol layer operable to facilitate communication of the MTP-3 messages.

* * * * *